R. E. DUPUY.
COTTON GINNING AND SPINNING MACHINE.
APPLICATION FILED JULY 9, 1915.
1,195,794.
Patented Aug. 22, 1916.
2 SHEETS—SHEET 2.
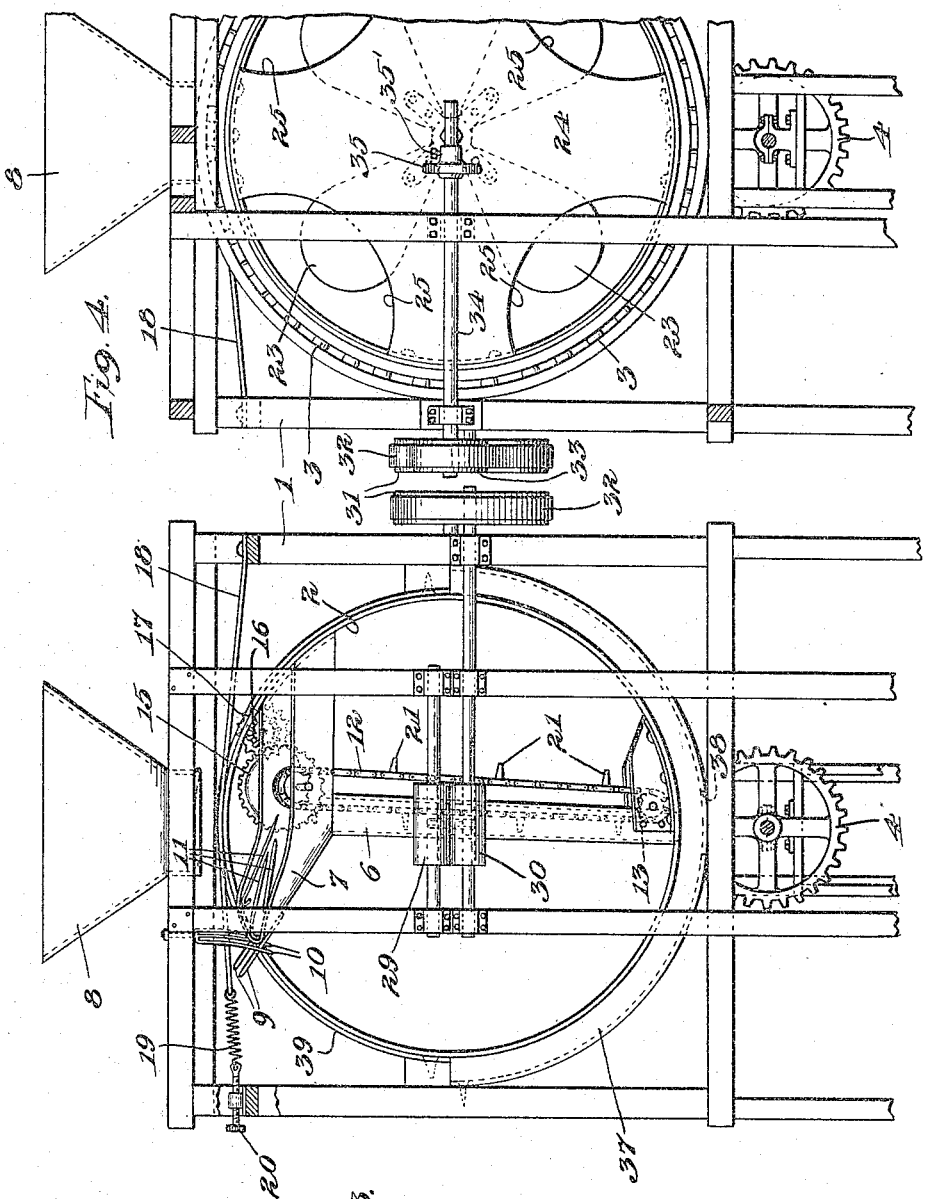
Witnesses:
K. J. Bull.
A. A. Olson.
Inventor,
Robert E. Dupuy,
by Joshua R. H. Potts
his Attorney.

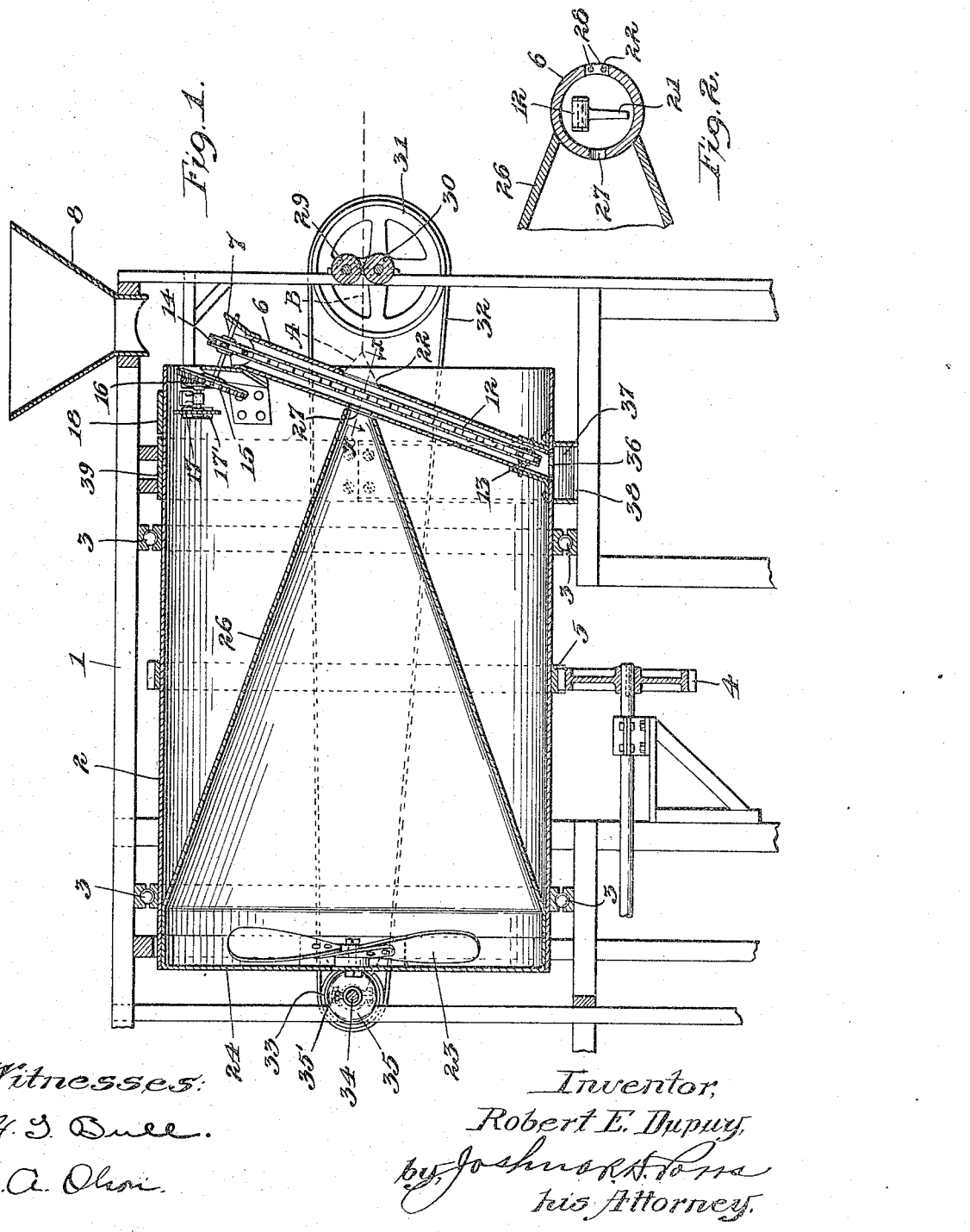

UNITED STATES PATENT OFFICE.

ROBERT EMMET DUPUY, OF ODELL, ILLINOIS.

COTTON GINNING AND SPINNING MACHINE.

1,195,794.  Specification of Letters Patent.  Patented Aug. 22, 1916.

Application filed July 9, 1915. Serial No. 39,029.

*To all whom it may concern:*

Be it known that I, ROBERT E. DUPUY, a citizen of the United States, and a resident of the city of Odell, county of Livingston, and State of Illinois, have invented certain new and useful Improvements in Cotton Ginning and Spinning Machines, of which the following is a specification.

My invention relates to improvements in cotton ginning and spinning machines and has for its object the production of a machine of this character which will be of durable and economical construction and through the medium of which cotton may be ginned and spun effectively and with great rapidity.

Other objects will appear hereinafter.

The invention consists in the combinations and arrangements of parts hereinafter described and claimed.

The invention will be best understood by reference to the accompanying drawings forming a part of this specification, and in which, Figure 1 is a central vertical longitudinal section of a cotton ginning and spinning machine embodying the invention, Fig. 2 is an enlarged detail section taken on line $x$—$x$ of Fig. 1, Fig. 3 is a partial sectional front elevation of the machine, and Fig. 4 is a rear elevation of the machine.

The preferred form of construction as illustrated in the drawings comprises a frame 1 in which is arranged a drum 2 rotatably mounted in ball bearings 3. The drum 2 is rotated through the medium of a gear 4 which meshes with a gear 5 on said drum, said gear 4 in operation, being driven from any suitable source of power supply.

Arranged within the drum 2 at one end thereof is a tubular member 6 transversely disposed but inclined relative to the longitudinal axis of said drum in order to position the opposite ends of said member 6 in different transverse planes. The member 6 is rigidly secured to the member 2 and at one end of the same is provided a sort of trough 7 which leads to the inlet end of said member. At the corresponding end of the drum 2 is provided a hopper 8 the lower end of which is positioned for registration with the inlet end of member 6 or the receiving trough 8 upon rotation of said drum 2.

Projecting from one end of receiving trough 7 is a pair of spaced fingers 9 adapted in passing the lower end of hopper 8, during rotation of the drum, to engage the cotton in the lower end of said hopper and withdraw the same therefrom. Thus with this arrangement it will be seen that during rotation of the drum cotton will be intermittently withdrawn from the hopper by the fingers 9. Coöperating with the fingers 9 is a plurality of spaced depending stationary fingers 10 adapted to pass between the fingers 9 and into the trough 7 in order to remove the cotton gathered by said fingers 9 and crowd the same down into said trough toward the adjacent inlet end of member 6. Coöperating with said trough is a plurality of spring fingers 11 the purpose of which is to prevent discharge of the cotton from the same because of centrifugal force developed during rotation of the drum. The arrangement of fingers 11 is such that, in the operation of the machine, the fingers 10 will be adapted to crowd the cotton removed thereby from the fingers 9, past the inner ends of said fingers 11 as will be readily understood.

The cotton which is thus delivered into the receiving trough 7 is carried into the member 6 by means of an endless conveyer belt or chain 12 which is mounted upon sprocket wheels 13 and 14 arranged at the respective ends of said member 6. Operatively connected with the sprocket wheel 14 is a bevel gear 15 which meshes with a bevel gear 16 operatively connected with a pointed or toothed wheel 17 which protrudes through an opening 17′ provided in drum 2. Said wheel 17 is adapted for engagement with a flexible contact member 18 in the form of a strap which is yieldingly held in engagement with the upper side of drum 2 by means of a helical tension spring 19 the tension of which may be adjusted by means of a screw 20 with which one end of said spring is connected. The wheel 17 is so positioned that the same will contact with the member 18 once during each complete rotation of the drum 2 thus effecting rotation of said wheel 17 and hence of the conveyer 12 with which the same is operatively connected. Hence with this connection during operation of the machine the conveyer 12 will be intermittently driven. Spaced upon the conveyer 12 are pointed teeth or fingers 21 adapted, upon movement of the conveyer 12, to engage with the cotton introduced into receiving trough 7 and carry the same into the member 6.

Formed in the front side of the member 6 intermediate the ends thereof is an elongated comparatively narrow opening 22 so positioned that the axis of rotation of said drum passes centrally through said opening. It is the purpose of the machine to withdraw the cotton conveyed through the member 6 by the conveying element 12 through the opening 22, at which point the spinning of the same is commenced, the seeds being removed from the cotton before withdrawal through said opening and conveyed along to the opposite end of said member 6. In order to insure removal of the cotton from the seeds it is necessary that the fibers of cotton be drawn through the opening 22 in an endless or connected string. And in order to secure the passage of fibers of cotton through said opening a current of air is utilized which is adapted to blow the same therethrough. To this end a fan 23 is provided which is arranged at the opposite end of drum 2 rigidly secured to the head 24 at said end of the drum. The head 24 is cut away as at 25, as clearly shown in Fig. 4, in order to allow for the entrance of air into said drum, the air thus admitted being forced forwardly by the fan 23 during rotation of the drum. A funnel 26 coöperates with the fan 23 for collecting and concentrating the air currents introduced therein and directing the same through an opening 27 formed in the member 6 diametrically opposite the opening 22. With this arrangement then it will be seen that during operation of the machine, as the cotton with the seeds therein is brought into registration with the opening 22 the fibers of cotton will be blown toward the opening 22 so as to insure the same being drawn into the vortex A which is formed beyond the opening 22 in the spinning operation. In the withdrawing of the cotton the same is torn from the seeds, the latter stripped of their cotton, being conveyed along the member 6 to the opposite end thereof. The opening 22 is of such dimensions as to not allow the passage of a cotton seed therethrough, and in order to provide an opening of a size to allow for a considerable quantity of air passing therethrough while at the same time prevent the cotton seed passing therethrough, a pair of bars 28 is arranged in said opening extending longitudinally thereof as clearly shown in Fig. 2.

Drawing of the cotton through the opening 22 and away from the element 6 is effected by means of a pair of contacting rollers 29 and 30, the latter of which is operatively connected with a pulley 31 which is connected by an endless belt 32 with a pulley 33 fastened to a shaft 34 provided at the opposite end of the machine. Upon the shaft 34 is arranged a friction wheel 35 adapted for engagement with the outer side of head 24 whereby said friction wheel and hence the rollers 29 and 30 will be driven during rotation of the drum. The friction wheel 35 is adjustably mounted upon the shaft 34 in order to allow for adjustment in the speed of rotation of the same, which may of course be altered by adjustment of said wheel relative to the center of rotation of head 24. The wheel 35 is adjustably fastened to the shaft 34 by means of a set screw 35′.

The seeds which are conveyed by the conveyer 12 past the opening 22 after the removal of the cotton therefrom are discharged by said conveyer through an opening 36 provided in the drum 2 into an annular chamber 37 which surrounds the lower portion of said drum, said chamber being provided centrally at its under side with an opening 38 through which the seeds deposited into said chamber may be discharged into a suitable receptacle for the purpose. Extending over the upper side of the drum 2 in the same circumferential plane as the chamber 37 is a shield 39 which prevents discharge of the seeds through opening 36 except into chamber 37.

The operation of the machine is simple. The cotton bearing the seeds therein known as seed cotton is first introduced into the hopper 8. Upon rotation of the drum 2 the seed cotton is intermittently withdrawn from said hopper by the fingers 9 and removed therefrom and crowded downwardly into the receiving trough 8 by means of fingers 10. At this point the seed cotton is picked up by the conveyer 12 and carried thereby through the member 6 to the opening 22. When the seed cotton is positioned in registration with the opening 22 the same is blown forwardly through said opening by the current of air generated by the fan 23, insuring the projection of the fibers of cotton and particularly those radiating from the cotton seeds, through the opening 22 and the interlocking and entanglement of the same with one another so as to cause all of the fibers to be drawn into the vortex A where the same are twisted or spun into cord or thread B. This twisting of the cotton known as lint cotton, the seeds having been removed therefrom, is of course effected by reason of the rotation of the drum 2, the line of spinning being coincident with the axis of rotation of said drum. The rollers 29 and 30 withdraw the lint cotton through the opening 22 being aided in the withdrawing operation by the current of air directed through said opening as above set forth. The size of the thread formed, that is the number of twists per inch may be varied by simply altering the relative speeds of rotation of the drum 2 and withdrawing rollers 29 and 30, such adjustments being of course effected by simply shifting the friction wheel 35. After the thread has passed between the rollers 29 and 30 the same may of course be wound upon spools or reels or taken care of in any way desired. The denuded seeds, that is the seeds from which the cotton has been stripped are carried to the discharge end of the member 6 being deposited into the chamber 37 whence the same are discharged through the opening 38 into a receptacle which may be provided for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described comprising an element through which seed cotton is adapted to pass, said element having an opening in one side thereof for the passage of lint cotton; means for rotating said element about an axis passing through said opening; and means for drawing the lint cotton through said opening away from said element, substantially as described.

2. A device of the class described comprising an element through which seed cotton is adapted to pass, said element having an opening in one side thereof for the passage of lint cotton; means for rotating said element about an axis passing through said opening; means for conveying the lint cotton through said element toward said opening; and means for drawing the lint cotton through said opening away from said element, substantially as described.

3. A device of the class described comprising an element through which seed cotton is adapted to pass, said element having an opening in one side thereof for the passage of lint cotton; means for rotating said element about a transverse axis passing centrally through said opening; and means for drawing said lint cotton through said opening away from said element in a line coincident with said axis of rotation, substantially as described.

4. A device of the class described comprising an element through which seed cotton is adapted to pass, said element having an opening in one side thereof for the passage of lint cotton; means for rotating said element about a transverse axis passing centrally through said opening; means for drawing said lint cotton through said opening away from said element in a line coincident with said axis of rotation; and means for governing the relative speeds of rotation of said element and of withdrawal of the cotton from said element, substantially as described.

5. A device of the class described comprising an element through which seed cotton is adapted to pass, said element having an opening in one side thereof for the passage of lint cotton; means for rotating said element about a transverse axis passing centrally through said opening; means for drawing said lint cotton through said opening away from said element in a line coincident with said axis of rotation; and means for directing a current of air through the interior of said element toward said opening, substantially as described.

6. A device of the class described comprising an element through which seed cotton is adapted to pass, said element having an opening in one side thereof for the passage of lint cotton; means for rotating said element about a transverse axis passing centrally through said opening; means for drawing said lint cotton through said opening away from said element in a line coincident with said axis of rotation; and means for directing a current of air transversely through the interior of said element toward said opening, substantially as described.

7. A device of the class described comprising an element through which seed cotton is adapted to pass, said element having an opening in one side thereof for the passage of lint cotton; a rotatable carrier for said element whereby the latter may be rotated about an axis passing through said opening; and means for drawing said lint cotton through the opening away from said element, substantially as described.

8. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein; and means for drawing the lint cotton through said opening away from said element in a line coincident with said axis of rotation, substantially as described.

9. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein; means for blowing the cotton toward said opening as the same is brought into registration therewith; and means for drawing the lint cotton through said opening away from said element in a line coincident with said axis of rotation, substantially as described.

10. A device of the class described comprising an element through which seed cotton is adapted to pass, said element having an opening in one side thereof for the passage of lint cotton from said element; means for rotating said element about a transverse axis passing through said opening; means for introducing the seed cotton into said element; an endless conveyer for conveying the seed cotton from its point of introduction into said element to said opening therein; and means for drawing the lint cotton through said opening away from said element in a line coincident with said axis of rotation, substantially as described.

11. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein, said conveying means comprising a traveling endless flexible member having projections thereon adapted for engagement with the cotton; and means for drawing the lint cotton through said opening away from said element in a line coincident with said axis of rotation, substantially as described.

12. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein, said conveying means comprising a traveling endless flexible member having projections thereon adapted for engagement with the cotton; means for blowing the cotton toward said opening as the same is brought into registration therewith; and means for drawing the lint cotton through said opening away from said element in a line coincident with said axis of rotation, substantially as described.

13. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein; means for driving said conveying means at a rate of speed proportioned directly to the speed of rotation of said element; and means for drawing the lint cotton through said opening away from said element in a line coincident with said axis of rotation, substantially as described.

14. A device of the class described comprising an element through which seed cotton is adapted to pass, said element having an opening in one side thereof for the passage of lint cotton from said element, said opening being of such dimensions as to prevent the passage of the cotton seeds therethrough; means for rotating said element about a transverse axis passing through said opening; means for introducing the seed cotton at one end of said element; means for conveying the cotton from its point of introduction into said element to said opening therein and for conveying the denuded cotton seeds beyond said opening for discharge from said element; and means for drawing the lint cotton through said opening away from said element in a line coincident with said axis of rotation, substantially as described.

15. A device of the class described comprising an element through which seed cotton is adapted to pass, said element having an opening in one side thereof for the passage of lint cotton from said element, said opening being of such dimensions as to prevent the passage of the cotton seeds therethrough; means for rotating said element about a transverse axis passing through said opening; means for introducing the seed cotton at one end of said element; means for conveying the seed cotton from its point of introduction into said element to said opening therein and for conveying the denuded cotton seeds beyond said opening for discharge from said element; means for blowing the seed cotton toward said opening as the same is brought into registration therewith; and means for drawing the lint cotton through said opening away from said element in a line coincident with said axis of rotation, substantially as described.

16. A device of the class described comprising an element having an elongated passage through which seed cotton is adapted to pass, said element having an inlet opening at one end thereof and an outlet opening intermediate its ends; means for rotating said element about a transverse axis passing through said outlet opening; means for introducing the seed cotton into said element, said means comprising a hopper having its discharge end positioned for registration with said inlet opening of said element upon rotation of the latter; means on said element for withdrawing the cotton from said hopper as the inlet opening of said element passes the same; means for conveying the cotton from said inlet opening to said outlet opening; and means for drawing the lint cotton through said opening away from said element in a line coincident with said axis of rotation, substantially as described.

17. A device of the class described comprising an element having an elongated passage through which seed cotton is adapted to pass, said element having an inlet opening at one end thereof and an outlet opening intermediate its ends; means for rotating said element about a transverse axis passing through said outlet opening; means for introducing the seed cotton into said element, said means comprising a hopper having its discharge end positioned for registration with said inlet opening of said element upon rotation of the latter; means on said element for withdrawing the cotton from said hopper as the inlet opening of said element passes the same; means traversing said inlet opening for preventing discharge from said opening because of centrifugal force; means for conveying the cotton from said inlet opening to said outlet opening; and means for drawing the lint cotton through said opening away from said element in a line coincident with said axis of rotation, substantially as described.

18. A device of the class described comprising an element having an elongated passage through which seed cotton is adapted to pass, said element having an inlet opening at one end thereof and an outlet opening intermediate its ends; means for rotating said element about a transverse axis passing through said outlet opening; means for introducing the seed cotton into said element, said means comprising a hopper having its discharge end positioned for registration with said inlet opening of said element upon rotation of the latter; spaced fingers on said element for withdrawing the cotton from said hopper as the inlet opening of said element passes the same; means for conveying the cotton from said inlet opening to said outlet opening; and means for drawing the lint cotton through said opening away from said element in a line coincident with said axis of rotation, substantially as described.

19. A device of the class described comprising an element having an elongated passage through which seed cotton is adapted to pass, said element having an inlet opening at one end thereof and an inlet opening intermediate its ends; means for rotating said element about a transverse axis passing through said outlet opening; means for introducing the seed cotton into said element, said means comprising a hopper having its discharge end positioned for registration with said inlet opening of said element upon rotation of the latter; means on said element for withdrawing the cotton from said hopper as the inlet opening of said element passes the same; spaced resilient fingers traversing said inlet opening for preventing discharge from said opening because of centrifugal force; a second set of spaced stationary fingers adapted upon rotation of said element to crowd the cotton past said first mentioned fingers; means for conveying the cotton from said inlet opening to said outlet opening; and means for drawing the lint cotton through said opening away from said element in a line coincident with said axis of rotation, substantially as described.

20. A device of the class described comprising an element having an elongated passage through which seed cotton is adapted to pass, said element having an inlet opening at one end thereof and an outlet opening intermediate its ends; means for rotating said element about a transverse axis passing through said outlet opening; means for introducing the seed cotton into said element, said means comprising a hopper having its discharge end positioned for registration with said inlet opening of said element upon rotation of the latter; means on said element for withdrawing the seed cotton from said hopper as the inlet opening of said element passes the same; stationary means adapted upon rotation of said element to crowd the cotton from said withdrawing means into said inlet opening; means for conveying the cotton from said inlet opening to said outlet opening; and means for withdrawing the lint cotton through said opening, substantially as described.

21. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein; means for driving said conveying means at a rate of speed proportioned directly to the speed of rotation of said element, said driving means comprising a stationary contact member; a wheel connected with said conveyer and movable in unison with said element, and adapted upon rotation of said element, to intermittently engage with and be turned by said contact member; and means for drawing the lint cotton through said opening away from said element in a line coincident with said axis of rotation, substantially as described.

22. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein; means for driving said conveying means at a rate of speed proportioned directly to the speed of rotation of said element, said driving means comprising a stationary contact member; a wheel connected with said conveyer and movable in unison with said element, and adapted upon rotation of said element, to intermittently engage with and be turned by said contact member; means for yieldingly holding said contact member in operative position; and means for drawing the lint cotton through said opening away from said element in a line coincident with said axis of rotation, substantially as described.

23. A device of the class described comprising an element through which seed cotton is adapted to pass, said element having an opening in one side thereof for the passage of lint cotton from said element; means for rotating said element about a transverse axis passing through said opening; means for introducing the seed cotton into said element; means for conveying the seed cotton from its point of introduction into said element to said opening therein; means for driving said conveying means at a rate of speed proportioned directly to the speed of rotation of said element, said driving means comprising a stationary contact member; a wheel connected with said conveyer and movable in unison with said element, and adapted upon rotation of said element, to intermittently engage with and be turned by said contact member; an adjustable tension spring for yieldingly holding said contact member in operative position; and means for drawing the lint cotton through said opening away from said element in a line coincident with said axis of rotation, substantially as described.

24. A device for ginning and spinning cotton comprising a rotatable drum; a tubular element carried by and positioned transversely in said drum through which seed cotton is adapted to pass, said element having an opening in one side thereof for the passage of lint cotton from said element, the axis of rotation of said drum being through said opening; means for introducing the seed cotton into said element and conveying the same therethrough to said opening; a fan carried by said drum for creating a current of air adapted to blow the cotton toward said opening when the same reaches a position in registration therewith; and means for drawing the lint cotton through said opening from said element in a line coincident with said axis of rotation, substantially as described.

25. A device of the class described comprising an element through which seed cotton is adapted to pass, said element having an opening in one side thereof for the passage of lint cotton; and means for drawing the lint cotton through said opening away from said element, said element and means having relative rotary movement about an axis passing through the opening in said element, substantially as described.

26. A device of the class described comprising an element through which seed cotton is adapted to pass, said element having an opening in one side thereof for the passage of lint cotton; means for conveying the seed cotton through said element toward said opening; and means for drawing the lint cotton through said opening away from said element, said element and said last mentioned means having relative rotary movement about an axis passing through said opening in said element, substantially as described.

27. A device of the class described comprising an element through which seed cotton is adapted to pass, said element having an opening in one side thereof for the passage of lint cotton; means for drawing said lint cotton through said opening away from said element, said element and said last mentioned means being relatively rotatable about an axis passing through said opening; and means for directing a current of air through the interior of said element toward said opening, substantially as described.

28. A device of the class described comprising an element into which seed cotton is adapted to be introduced, said element having an opening in one side thereof for the passage of lint cotton; and means for drawing the lint cotton through said opening away from said element, said element and means having relative rotary movement, substantially as described.

29. A device of the class described comprising an element into which seed cotton is adapted to be introduced, said element having an opening in one side thereof for the passage of lint cotton; means for drawing the lint cotton through said opening away from said element, said element and means having relative rotary movement; and means for governing the speed of relative rotation of said parts and the speed of withdrawal of the lint cotton from said element, substantially as described.

30. A device of the class described comprising an element into which seed cotton is adapted to be introduced, said element having an opening in one side thereof for the passage of lint cotton; means for blowing the seed cotton toward said opening as the same is brought into registration therewith; and means for drawing the lint cotton through said opening away from said element, said element and means having relative rotary movement, substantially as described.

31. A device of the class described comprising an element through which seed cotton is adapted to pass, said element having an opening in one side thereof for the passage of lint cotton from said element; means for introducing the seed cotton into said element; means for conveying the seed cotton from its point of introduction into said element to said opening therein; and means for drawing the lint cotton through said opening away from said element, said element and last mentioned means having relative rotary movement, substantially as described.

32. A device of the class described comprising an element through which seed cotton is adapted to pass, said element having an opening in one side thereof for the passage of lint cotton from said element; means for introducing the seed cotton into said element; an endless conveyer for conveying the seed cotton from its point of introduction into said element to said opening therein; and means for drawing the lint cotton through said opening away from said element, said element and last mentioned means having relative rotary movement, substantially as described.

33. A device of the class described comprising an element through which seed cotton is adapted to pass, said element having an opening in one side thereof for the passage of lint cotton from said element; means for introducing the seed cotton into said element; means for conveying the seed cotton from its point of introduction into said element to said opening therein, said conveying means comprising a traveling endless flexible member having projections thereon adapted for engagement with the cotton; and means for drawing the lint cotton through said opening away from said element, said element and said last mentioned means having relative rotary movement, substantially as described.

34. A device of the class described comprising an element through which seed cotton is adapted to pass, said element having an opening in one side thereof for the passage of lint cotton from said element, said opening being of such dimensions as to prevent the passage of cotton seeds therethrough; means for introducing the seed cotton into said element; means for conveying the cotton from its point of introduction into said element to said opening therein and for conveying the denuded cotton seeds beyond said opening for discharge from said element; and means for drawing the lint cotton through said opening away from said element, said element and said last mentioned means having relative rotary movement, substantially as described.

35. A device of the class described comprising an element through which seed cotton is adapted to pass, said element having an opening in one side thereof for the passage of lint cotton from said element, said opening being of such dimensions as to prevent the passage of cotton seeds therethrough; means for introducing the seed cotton into said element; means for conveying the cotton from its point of introduction into said element to said opening therein for conveying the denuded cotton seeds beyond said opening for discharge from said element; means for blowing the seed cotton toward said opening as the same is brought into registration therewith; and means for drawing the lint cotton through said opening away from said element, said element and said last mentioned means having relative rotary movement, substantially as described.

In testimony whereof I have signed my name to this specification in the presence of two subscribing witnesses.

ROBERT EMMET DUPUY.

Witnesses:
 THOS. HIGGINS,
 D. J. GARBER.

Copies of this patent may be obtained for five cents each, by addressing the "Commissioner of Patents, Washington, D. C."